United States Patent
Kim

(10) Patent No.: US 9,218,593 B2
(45) Date of Patent: Dec. 22, 2015

(54) NOTIFICATION CONTROL METHOD AND ELECTRONIC DEVICE FOR THE SAME

(71) Applicant: Samsung Electronics Co., Ltd, Gyeonggi-do (KR)

(72) Inventor: Moon-Soo Kim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 14/164,032

(22) Filed: Jan. 24, 2014

(65) Prior Publication Data

US 2014/0215494 A1    Jul. 31, 2014

(30) Foreign Application Priority Data

Jan. 25, 2013  (KR) .................. 10-2013-0008408

(51) Int. Cl.
*G06F 9/54*   (2006.01)
*G06Q 10/10*  (2012.01)
*G06Q 10/06*  (2012.01)

(52) U.S. Cl.
CPC .................................. *G06Q 10/109* (2013.01)

(58) Field of Classification Search
None
See application file for complete search history.

(56) References Cited

U.S. PATENT DOCUMENTS

| | | | |
|---|---|---|---|
| 5,652,571 A * | 7/1997 | Shima et al. ................. | 340/7.52 |
| 2004/0225718 A1* | 11/2004 | Heinzel et al. ................ | 709/206 |
| 2006/0210024 A1* | 9/2006 | Qiu ............................ | 379/88.01 |
| 2009/0327352 A1* | 12/2009 | Thomas et al. ............... | 707/200 |
| 2011/0045803 A1* | 2/2011 | Kim et al. .................. | 455/412.2 |
| 2013/0267280 A1* | 10/2013 | Delco et al. .................... | 455/567 |

FOREIGN PATENT DOCUMENTS

KR    10-2000-0009724    2/2000

* cited by examiner

*Primary Examiner* — Andy Ho
*Assistant Examiner* — Abdou Seye

(57) ABSTRACT

A method for controlling a notification in an electronic device includes detecting notification events, confirming whether the detected notification events exist within a first reference time, when the notification events exist within the first reference time, confirming whether the number of unconfirmed notifications including the notification events exceeds a reference number, and, when the number of unconfirmed notifications exceeds the reference number, outputting the notification events after a second reference time.

16 Claims, 12 Drawing Sheets

NOTIFICATION CONTROL METHOD AND ELECTRONIC DEVICE FOR THE SAME

PRIORITY

The present application is related to and claims priority under 35 U.S.C. §119 to an application filed in the Korean Intellectual Property Office on Jan. 25, 2013 and assigned Serial No. 10-2013-0008408, the contents of which are incorporated herein by reference.

TECHNICAL FIELD

The present disclosure relates generally to an apparatus and method for processing an event in an electronic device.

BACKGROUND

Electronic devices, which have become a necessity of modern people due to their easiness of carrying, are evolving into multimedia devices providing various services such as voice and video calling, information input and output functions, and data transmission and reception.

Some application programs included in an electronic device can provide a notification of various events. For example, in the case of missed calls, the electronic device can provide a notification including sounds, vibrations, the screen turning on, and a light turning on in order to provide notification of the missed calls. As another example, when receiving a message, an electronic device may also provide sounds, vibrations, the screen turning on, and lights turning on to indicate the received message or to provide notification of the message reception. When a user of the electronic device does not confirm the message, noise occurs and unnecessary power is consumed. Accordingly, the electronic device requires an improved method of controlling a notification event.

SUMMARY

To address the above-discussed deficiencies of the related art, it is a primary object to provide an apparatus and method for controlling a notification in an electronic device.

Another object of the present disclosure is to provide an apparatus and method for controlling notification events that occur within a reference time in an electronic device.

Another object of the present disclosure is to provide an apparatus and method for stopping outputting of notifications when a reference number of notification events occur within a reference time in an electronic device.

Another object of the present disclosure is to provide an apparatus and method for outputting notifications after a second reference time for notification events that occur more than the reference number within a first reference time in an electronic device.

In certain embodiments of the present disclosure, a method of controlling a notification in an electronic device includes: detecting notification events; confirming whether the detected notification events exist within a first reference time; when the notification events exist within the first reference time, confirming whether the number of unconfirmed notifications including the notification events exceeds a reference number; and when the number of unconfirmed notifications exceeds the reference number, outputting the notification events after a second reference time.

In certain embodiments of the present disclosure, an electronic device comprises: at least one processor; at least one memory; and at least one program stored in the at least one memory and configured to be executed by the at least one processor, wherein the at least one processor detects notification events; confirms whether the detected notification events exist within a first reference time; when the notification events exist within the first reference time, confirms whether the number of unconfirmed notifications including the notification events exceeds a reference number; and outputs the notification events after a second reference time when the number of unconfirmed notifications exceeds the reference number.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the teem "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Certain embodiments of the present disclosure will be described herein below with reference to the accompanying drawings. In the following description, detailed descriptions of well-known functions or constructions will be omitted since they would obscure the disclosure in unnecessary detail. Also, the terms used herein are defined according to the functions of the present disclosure. Thus, the terms may vary depending on user's or operator's intentions or practices. Therefore, the terms used herein must be understood based on the descriptions made herein.

Herein, a technology for controlling a notification in an electronic device is described. An electronic device can include a mobile communication terminal, a personal digital assistant (PDA), a laptop, a smart phone, a net book, a television, a mobile internet device (MID), an ultra mobile PC (UMPC), a tablet PC, a navigator, and an MP3 player.

Figure 1:
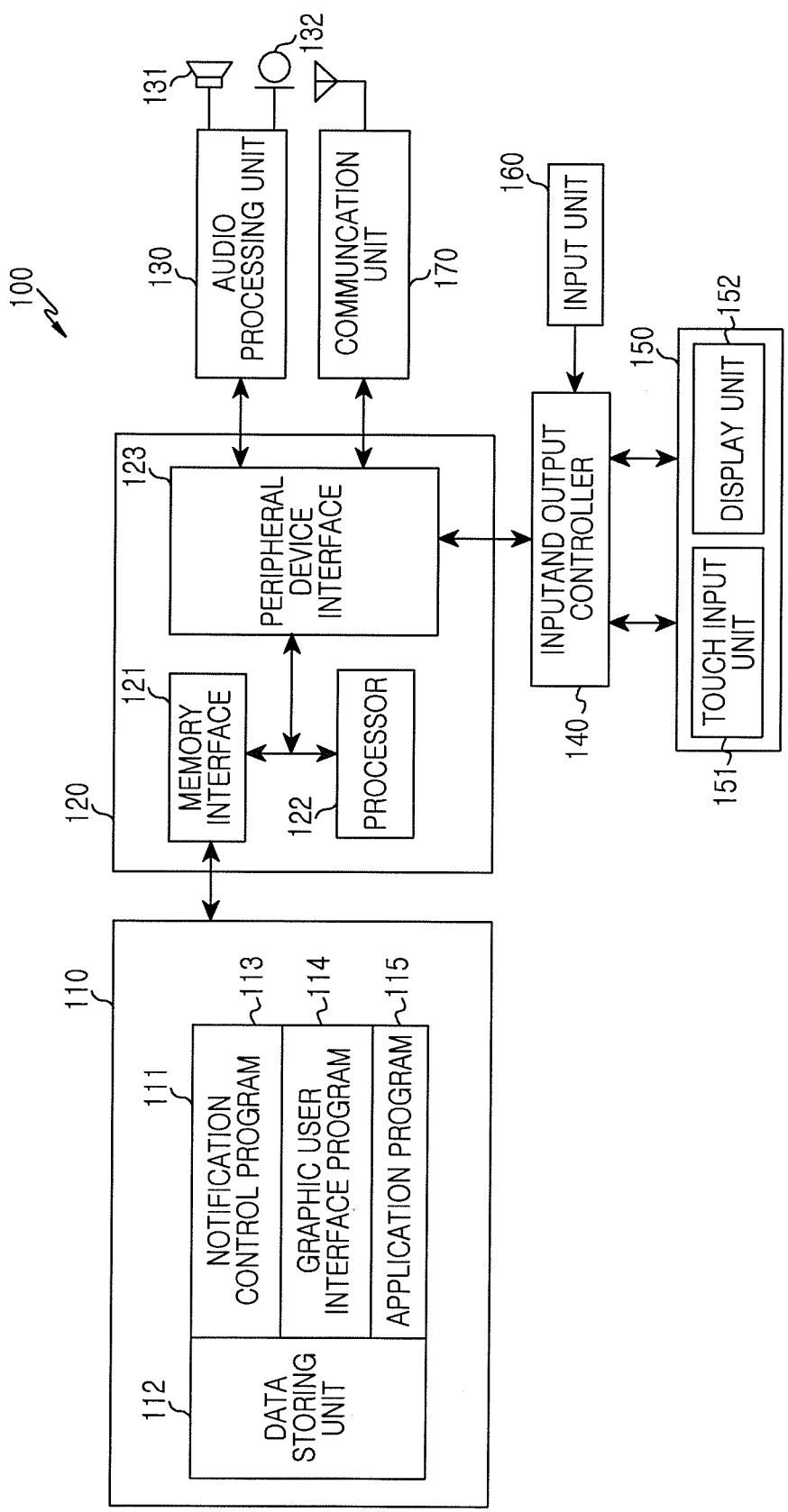
FIG. 1 illustrates a block configuration of an electronic device according to certain embodiments of the present disclosure.

FIG. 1 illustrates a block configuration of an electronic device according to the present disclosure. As shown in FIG. 1, the electronic device 100 can include a memory 110, a processor unit 120, an audio processing unit 130, an input output controller 140, a touch screen 150, an input unit 160, and a communication unit 170. Here, the memory 110 can be included in plural. Each element is described below in detail.

The memory 110 can include a program storing unit 111 for storing programs for controlling operations of the electronic device 100, and a data storing unit for storing data created during program execution. The program storing unit 111 can include a notification control program 113, a graphical user interface (GUI) program 114, and at least one application program 115. Here, a program stored in the program storing unit 111 can be represented as a set of instructions. The data storing unit 112 can include at least one software element for storing setting information for controlling a notification.

The notification control program 113 can include at least one software element for controlling a notification. For example, when a notification event occurs through at least one application program, the notification control program 113 confirms whether the notification event exists within a first reference time. When the notification event exists within the first reference time, the notification control program 113 confirms that the number of unconfirmed notifications including the notification event exceeds a reference number. When the number of the unconfirmed notifications exceeds the reference number, the notification control program 113 outputs the notification event after the second reference time. Also, when the number of unconfirmed notifications exceeds the reference number, the notification control program 113 can stop notifications for notification events whose number is more than the reference number. When the number of unconfirmed notifications does not exceed the reference number, the notification control program 113 can immediately output notifications for notification events.

The graphical user interface program 114 can include at least one software element for providing the display unit 152 with a graphical user interface. For example, the graphical user interface program 114 controls the number of unconfirmed notification events on the display unit 152 by using the notification control program. The application program 115 can include software elements for at least one application program installed in the electronic device 100.

The processor unit 120 can include a memory interface 121, at least one processor 122, and a peripheral device interface 123. Here, the memory interface 121, the at least one processor 122, and the peripheral device interface 123 included in the processor unit 120 can be implemented as one or more integrated circuits or as respective discrete elements and circuits.

The memory interface 121 controls access to the memory 110 of an element, such as the processor 122, or the peripheral interface 123. For example, the processor 122 can access to the memory 110 through the memory interface 121 in order to drive the at least one application program 115. The peripheral device interface 123 controls connection of input and output peripheral devices of the electronic device 100 to the processor 122 and the memory interface 121.

Figure 2:
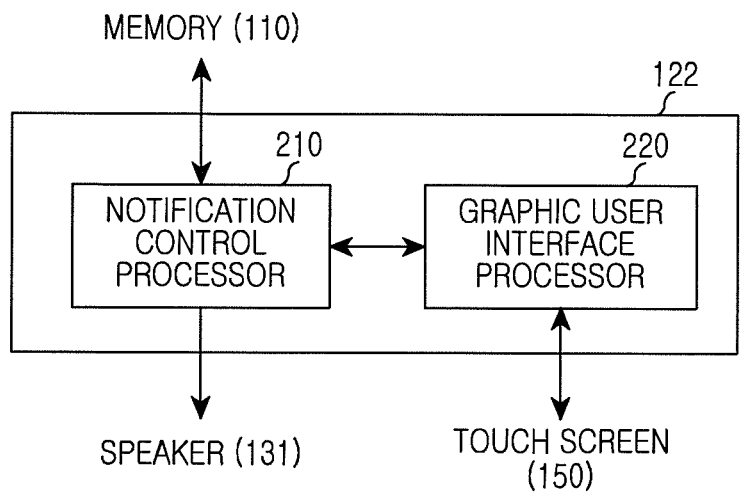
FIG. 2 illustrates a detailed block configuration of a processor according to certain embodiments of the present disclosure.

The processor 122 allows the electronic device 100 to provide various services by using at least one software program. At this time, the processor 122 executes at least one program stored in the memory 110 to provide the services according to corresponding program. For example, the processor 122 can be configured, as shown in FIG. 2, by executing the notification control program 113 to control notification.

The audio processing unit 130 provides an audio interface between a user and the electronic device 100 through the speaker 131 and the microphone 132. The input and output controller 140 provides an interface between input and output devices such as the touch screen 150 and the input unit 160, and the peripheral device interface 123.

The touch screen 150 is an input and output device for performing information input and output, and can include a touch input unit 151 and a display unit 152. The touch input unit 151 provides touch information detected through a touch panel to the processor unit 120 through the input and output controller 140. At this time, the touch input unit 151 provides touch information from an electronic pen or a finger to the processor unit 120 through the input and output controller 140.

The display unit 152 displays state information of the electronic device 100, letters input by a user, moving pictures, still images, and other information. For example, the display unit 152 displays the number of unconfirmed notification events by using the graphical user interface program 114. The input unit 160 provides input data created by a user's selection to the processor unit 120 through the input and output controller 140. For example, the input unit 160 includes only control buttons for controlling the electronic device 100. As another example, the input unit 160 can be configured with a keypad for receiving input data from a user.

The communication unit 170 can include at least one software element for performing voice communication and data communication. At this time, the communication unit 170 can be divided into a plurality of communication sub-modules supporting different communication networks. For example, the communication network can include, but is not limited to, a global system for mobile communications (GSM) network, an enhanced data for global evolution (EDGE) network, a code-division multiple access (CDMA) network, a wideband-CDMA (W-CDMA) network, a long term evolution (LIE) network, an orthogonal frequency-division multiple access (OFDMA) network, a wireless LAN, a Bluetooth network, and a near field communication (NFC).

FIG. 2 illustrates a detailed block configuration of a processor according to certain embodiments of the present disclosure. As shown in FIG. 2, the processor 122 can include a notification control processor 210, and a graphical user interface processor 220.

The notification control processor 210 controls a notification by executing the notification control program 113 stored in the program storing unit 111. For example, when notification events occur through at least one application program, the notification control processor 210 confirms the notification events exist within a first reference time. When the notification events exist within the first reference time, the notification control processor 210 confirms that the number of unconfirmed notifications including the notification events exceeds a reference number. When the number of the unconfirmed notifications exceeds the reference number, the notification control processor 210 outputs the notification event after the second reference time. Also, when the number of unconfirmed notifications exceeds the reference number, the notification control processor 210 can stop notifications for notification events whose number is more than the reference number. When the number of unconfirmed notifications does not exceed the reference number, the notification control processor 210 can immediately output notifications for notification events.

The graphical user interface processor 220 executes a graphical user interface program 114 stored in the program storing unit 111 to provide as a user interface on the display unit 152. For example, the graphical user interface processor 220 displays the number of unconfirmed notification events provided by the notification control processor 210

In the above-described embodiments, the notification control processor 210 of an electronic device executes the notification control program 113 to control a notification. In another embodiment, the electronic device can include a separate notification control processor including the notification control program 113.

Figure 3A:
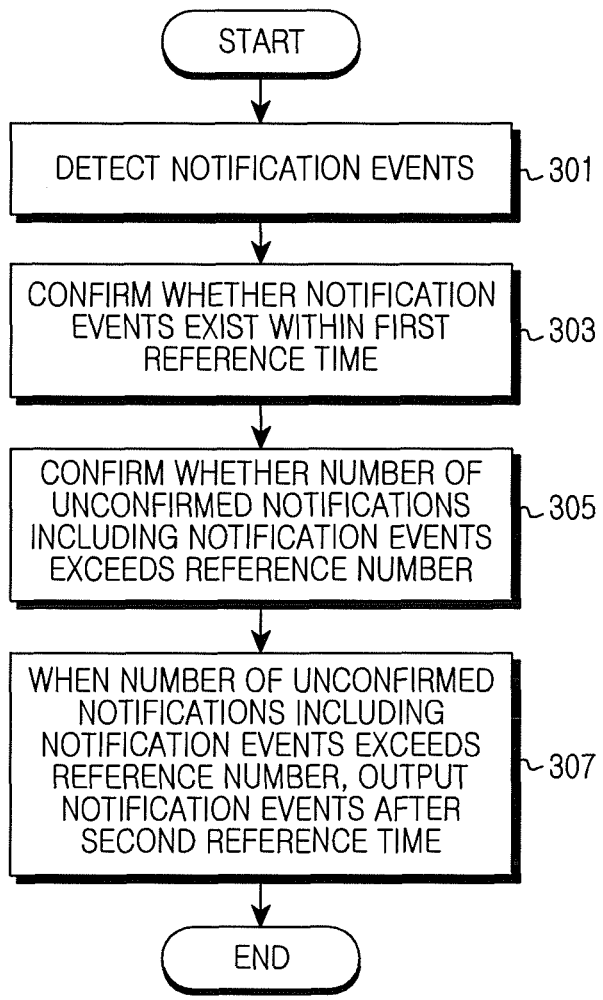
FIG. 3A illustrates a procedure of outputting notifications after a second reference time for notification events whose number is a reference number or more occurred within a first reference time in an electronic device according to certain embodiments of the present disclosure.

FIG. 3A illustrates a procedure for outputting notifications after a second reference time for notification events whose number is a reference number or more occurred within a first reference time in an electronic device according to certain embodiments of the present disclosure. Referring to FIG. 3A, in operation 301, the electronic device detects notification events. For example, the electronic device confirms that notification events occur for outputting at least one of sound, vibration, screen turning on, and lamp turning on in at least one application program.

Figure 8A:
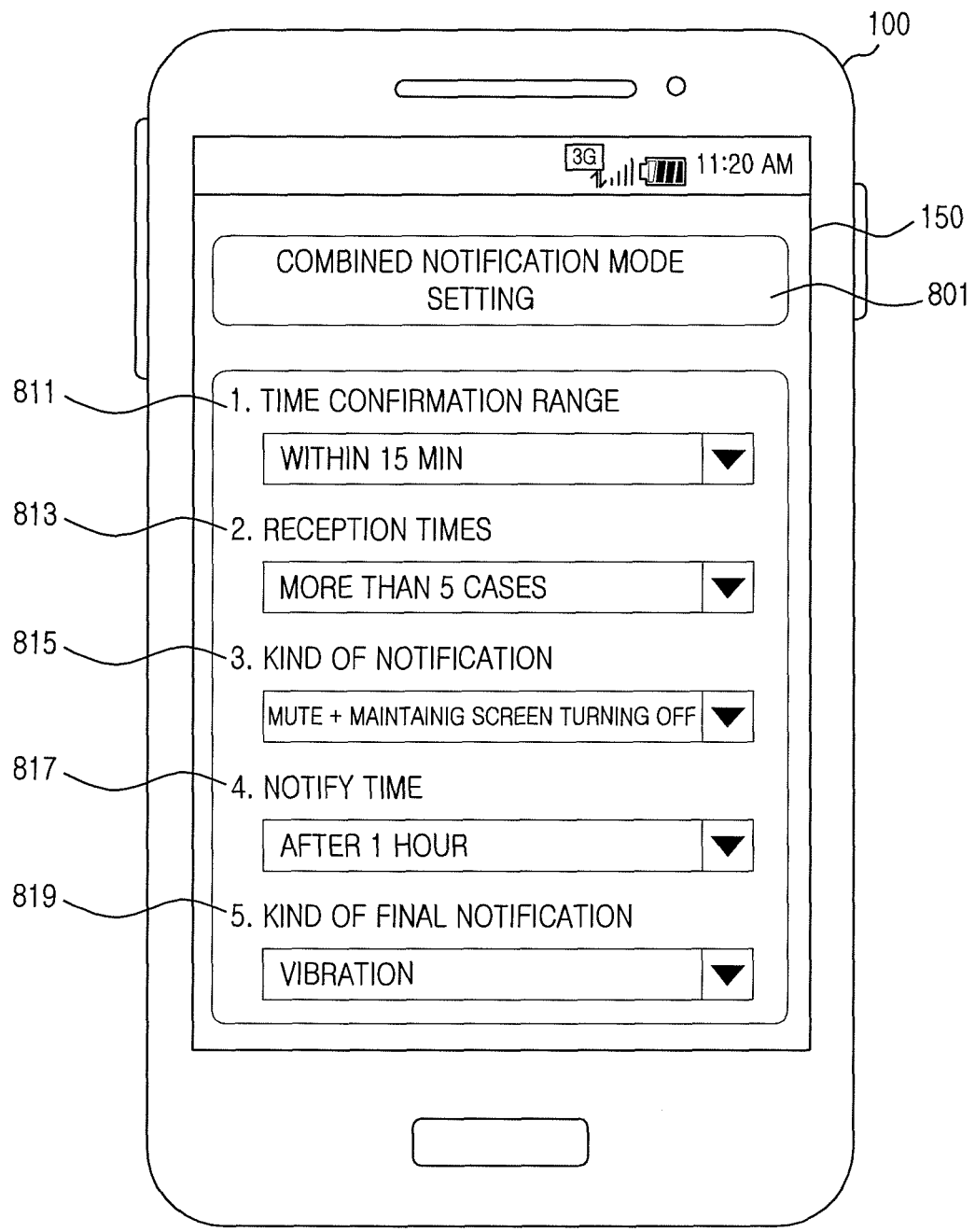
FIGS. 8A through 8D illustrate a screen configuration for controlling a notification in an electronic device according to certain embodiments of the present disclosure.

When the notification events are detected, the electronic device proceeds to an operation 303 and confirms whether the notification events exist within the first reference time. At this time, the electronic device confirms whether a timer is driven. When it is not driven, the timer is driven in consideration of at least one of a preset time by a system or a preset time by a user. For example, as shown in FIG. 8A, when "time confirmation range" 811 is set to "within 15 min." in setting of "combined notification mode" 801, the electronic device sets the timer driving time to 15 min. At this time, the electronic device initializes the number of unconfirmed notifications to "0". When the timer is being driven, the electronic device can update the number of unconfirmed notifications by adding "1".

Figure 8B:
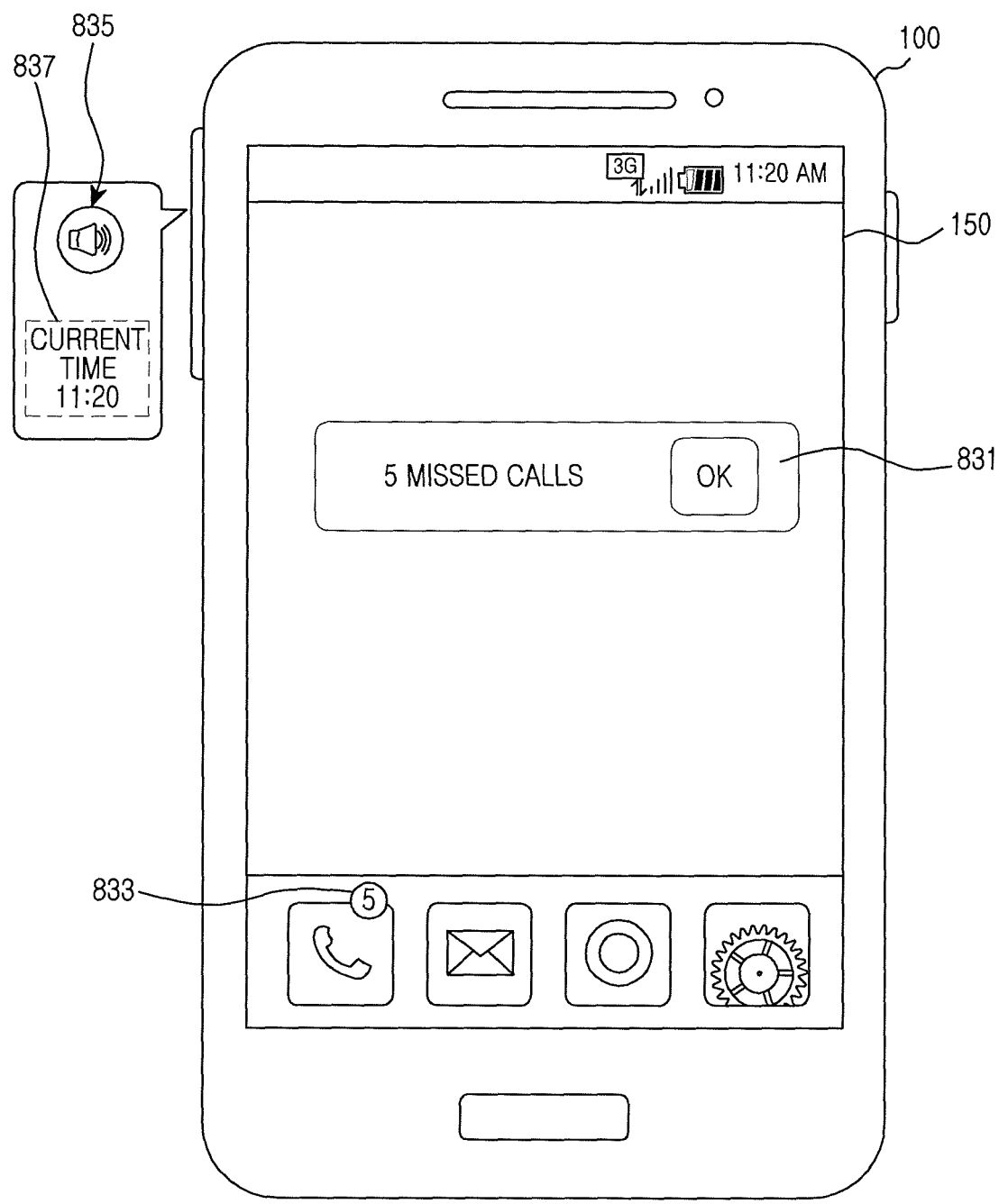

When the notification events exist within the first reference time, the electronic device proceeds to an operation 305, and confirms whether the number of the unconfirmed notifications including the notification events exceeds a reference number. For example, as shown in FIG. 8A, when "the number of receptions" 813 is set to "more than 5 cases" in the setting of the "combined notification mode" 801, the electronic device confirms, as shown in FIG. 8B, whether the number of unconfirmed notifications including notification events for "missed calls" is 5 or more.

Figure 8C:
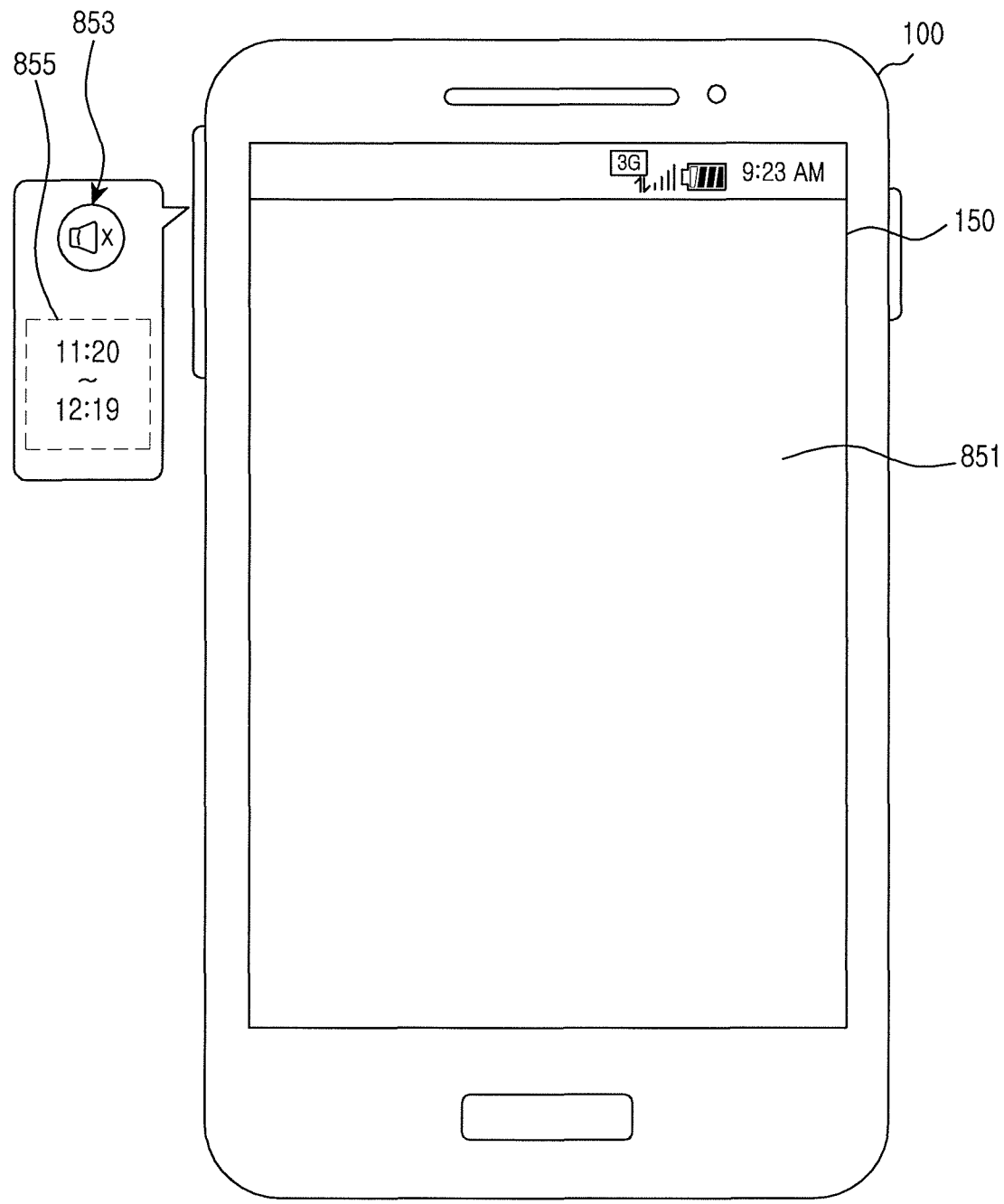

When the number of unconfirmed notifications exceeds the reference number, the electronic device proceeds to an operation 307 and outputs the notification events after the second reference time. For example, as shown in FIG. 8C, when a notification event for "missed calls" is a $10^{th}$ unconfirmed notification event, the electronic device recognizes that the unconfirmed notification events occur more than the reference number while the timer is driven. Accordingly, the electronic device stops outputting of a notification (operation 853). At this time, as shown in FIG. 8A, when "kind of notification" 815 is set as "mute+maintaining screen turning off" in the setting of the "combined notification mode" 801, the electronic device can change both sound and screen to be in OFF states.

Additionally, when the number of unconfirmed notifications does not exceed the reference number, the electronic device can output notifications in consideration of notification settings. For example, as shown in FIG. 8B, when the number of unconfirmed notifications including notification events for "missed calls" is smaller than 5, the electronic device provides "sound" 835 according to the notification setting for the "missed calls". Also, the electronic device can display a notification message for the "missed calls" on the display unit 152 (operation 831). Furthermore, the electronic device can display the number of missed calls on a phone icon for a notification for "missed calls" (operation 833). Thereafter, the electronic device ends the present algorithm.

Figure 3B:
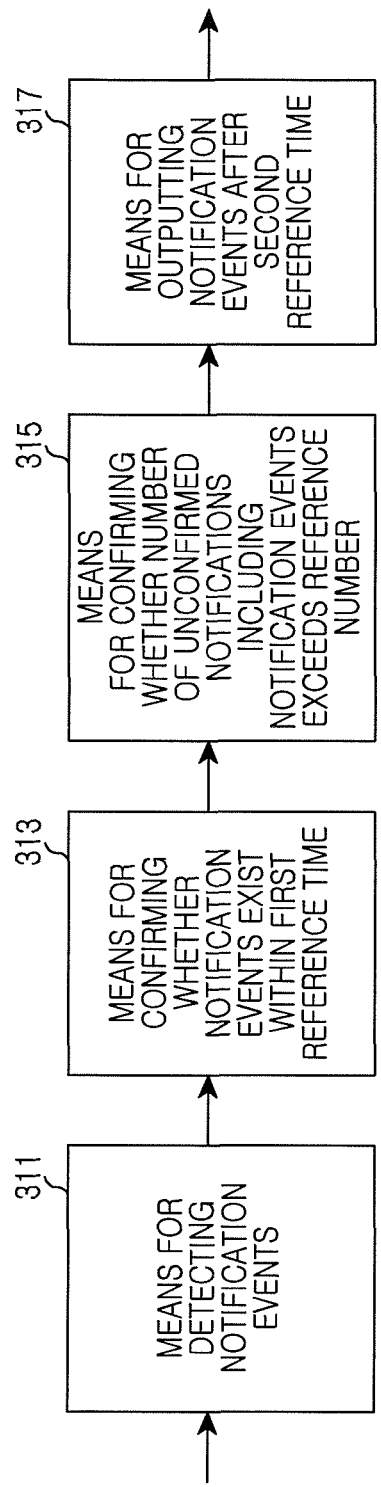
FIG. 3B illustrates a configuration of an electronic device for outputting notifications after the second reference time for the notification events whose number is a reference number or more occurred within the first reference time in an electronic device according to certain embodiments of the present disclosure.

As described above, a procedure for controlling a notification in an electronic device can be, as shown in FIG. 3B, configured as a device for controlling a notification in the electronic device.

FIG. 3B illustrates a configuration of an electronic device for outputting notifications after the second reference time for notification events whose number is a reference number or more occurred within the first reference time according to certain embodiments of the present disclosure. Referring to FIG. 3B, the electronic device can include a first means 311 for detecting notification events, a second means 313 for confirmiing whether notification events exist within the first time, a third means 315 for confirming whether the number of unconfirmed notifications including the notification events exceeds the reference number, and a fourth means 317 for outputting the notification events after the second reference time.

The first means 311 detects the notification events. For example, the electronic device confirms that the notification events occur in order to output at least one of sounds, vibrations, turning the screen on, and turning a light on in at least one application program.

The second means 313 confirms whether the notification events exist within the first reference time. At this time, in case where the timer is not driven, the electronic device drives the timer in consideration of at least one of preset time by a system and preset time by a user. For example, as shown in FIG. 8A, when "time confirmation range" 811 is set to be "within 15 min." in setting of "combined notification mode" 801, the electronic device sets timer driving time to 15 min. At this time, the electronic device initializes the number of unconfirmed notifications to "0". When the timer is being driven, the electronic device can update the number of unconfirmed notifications by adding "1".

The third means 315 confirms whether the number of unconfirmed notifications including notification events exceeds the reference number. For example, as shown in FIG. 8A, when "the number of receptions" 813 is set to "more than 5 cases" in the setting of the "combined notification mode" 801, the electronic device confirms, as shown in FIG. 8B, whether the number of unconfirmed notifications including notification events for "missed calls" is 5 or more.

The fourth means 317 outputs notification events after the second reference time. For example, as shown in FIG. 8B, when a notification event for "missed calls" is a $10^{th}$ unconfirmed notification event, the electronic device recognizes that the unconfirmed notification events occur more than the reference number while the timer is driven. Accordingly, as shown in FIG. 8C, the electronic device stops outputting of a notification (operation 853). At this time, as shown in FIG. 8A, when "kind of notification" 815 is set as "mute+maintaining screen turning off" in the setting of the "combined notification mode" 801, the electronic device can change both sound and screen to be in OFF states.

Additionally, when the number of unconfirmed notifications does not exceed the reference number, the electronic device can output notifications in consideration of the notification settings. For example, as shown in FIG. 8B, when the number of unconfirmed notifications including notification events for "missed calls" is smaller than 5, the electronic device provides "sound" 835 according to the notification setting for the "missed calls". Also, the electronic device can display a notification message for the "missed calls" on the display unit 152 (operation 831). Furthermore, the electronic device can display the number of missed calls on a phone icon for a notification for "missed calls" (operation 833).

As described above, the electronic device can include each means for controlling a notification. At this time, each means for controlling the notification can be integrated into one means in the electronic device.

Figure 4:
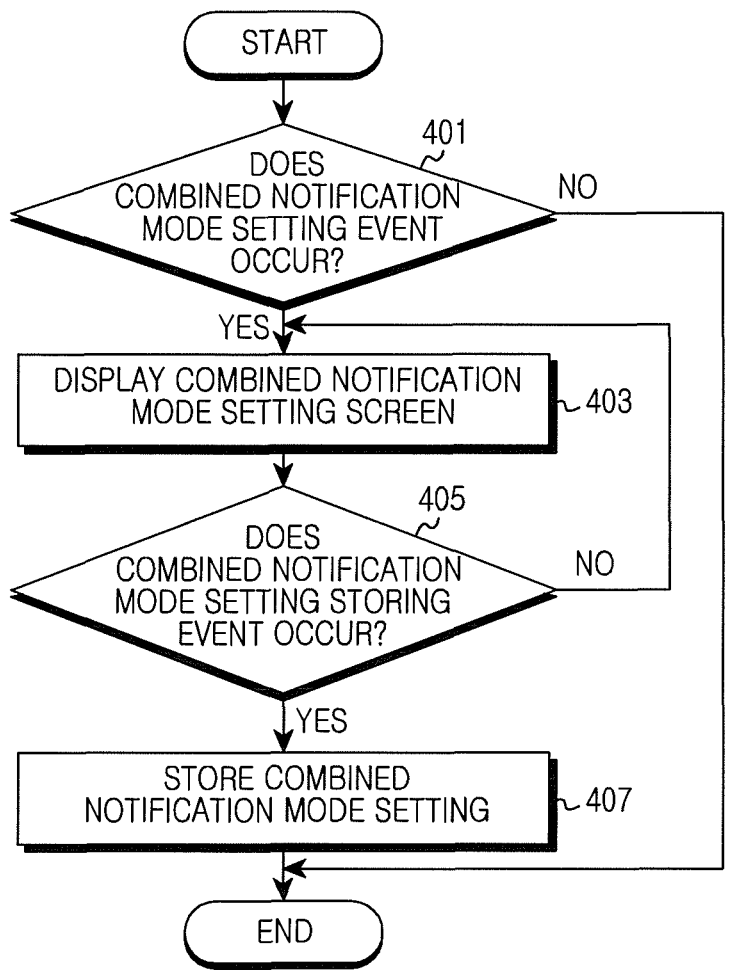
FIG. 4 illustrates a setting procedure of outputting notifications after the second reference time for the notification events whose number is a reference number or more occurred within the first reference time in an electronic device according to certain embodiments of the present disclosure.

FIG. 4 illustrates a setting procedure for outputting notifications after the second reference time for notification, events whose number is at or above a reference number, which occurred within the first reference time in an electronic device according to certain embodiments of the present disclosure. Referring to FIG. 4, the electronic device confirms whether a setting event occurs for a combined notification mode in operation 401. When the setting event for the combined notification mode does not occur, the electronic device ends the algorithm.

Furthermore, when the setting event for the combined notification mode occurs, the electronic device proceeds to an operation 403 and displays a setting screen for the combined notification mode. For example, the electronic device, as shown in FIG. 8A, displays on the display unit 152 a setting screen for the "combined notification mode" 801 including "time confirmation range" 811, "the number of receptions" 813, "kind of notification" 815, "notification time" 817, and "kind of final notification" 819.

After displaying the combined notification mode setting screen, the electronic device confirms a storing event for the combined notification mode setting. When the storing event for the combined notification mode setting does not occur, the electronic device proceeds to an operation 403 and continuously displays the setting screen for the combined notification mode.

Furthermore, when the storing event for the combined notification mode setting occurs, the electronic device proceeds to an operation 407 and stores the setting for the combined notification mode. For example, as shown in FIG. 8A, when notification events occur "more than 5 cases" "within 15 min.", the electronic device sets notification outputs for notification events to occur thereafter as "mute+maintaining screen turning off", and stores setting of a notification output as "vibration" "after one hour". Then, the electronic device ends the present algorithm.

Figure 5:
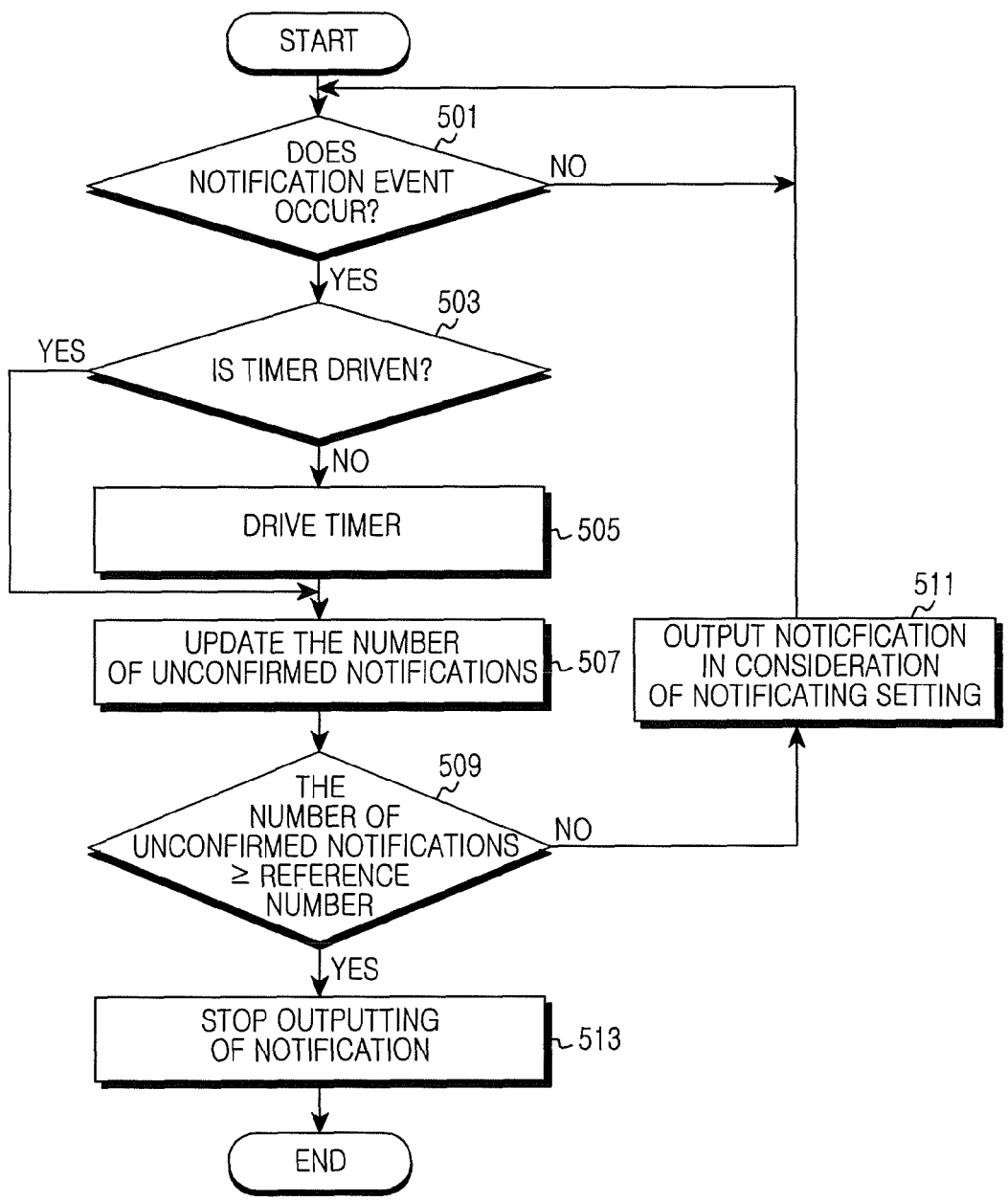
FIG. 5 illustrates a procedure for stopping outputting of notification events, when notification events whose number is a reference number or more occur within the first reference time in an electronic device.

FIG. 5 illustrates a procedure for stopping outputting of notification events, when the notification events whose number is a reference number or more occur within the first reference time in an electronic device according to certain embodiments of the present disclosure. Referring to FIG. 5, the electronic device confirms whether notification events occur in operation 501. For example, the electronic device confirms whether notification events occur in order to output at least one of sounds, vibrations, turning the screen on and turning on a light in at least one application program.

When the notification events occur, the electronic device proceeds to an operation 502 and confirms a timer is driven. When the timer is not driven, the electronic device proceeds to an operation 505 and drives the timer. At this time, the electronic device drives the timer in consideration of at least one of a time preset by a system and a time preset by a user. For example, as shown in FIG. 8A, when "time confirmation range" 811 is set to be "within 15 min.", the electronic device sets the timer driving time to 15 min. At this time, the electronic device initializes the number of unconfirmed notifications to "0". At this time, as shown in FIG. 8B, the timer driving start time is determined in consideration of a time 837 when the notification events occur.

After driving the timer, the electronic device proceeds to an operation 507 and updates the number of unconfirmed notifications. For example, as shown in FIG. 8B, when a notification event for "missed calls" occurs, the electronic device updates the initialized number of unconfirmed notifications to "1".

Furthermore, when the timer is driven in operation 503, the electronic device proceeds to operation 507 and updates the number of unconfirmed notifications. For example, as shown in FIG. 8B, when a notification event for the "missed calls" occurs, the electronic device updates the number of unconfirmed notifications by adding "1" thereto.

After updating the number of the unconfirmed notifications in operation 507, the electronic device proceeds to operation 509 to confirm whether the number of unconfirmed notifications is the reference number or more. For example, as shown in FIG. 8A, when "the number of receptions" 813 in setting of "combined notification mode" 801 is "more than 5 cases", the electronic device, as shown in FIG. 8B, confirms whether the number of unconfirmed notifications including notification events is 5 or more.

When the number of unconfirmed notifications is smaller than the reference number in operation 509, the electronic device proceeds to operation 511 and outputs a notification in consideration of the notification setting. For example, as shown in FIG. 8B, when the number of unconfirmed notifications including the notification event "missed calls" is smaller than 5, the electronic device provides "sound" 835 according to the notification setting. Also, the electronic device can display the number of missed calls on a phone icon for notification for "missed calls" (operation 833). Thereafter, the electronic device proceeds to operation 501 and detects notification events.

Furthermore, when the number of unconfirmed notifications is the reference number or more, the electronic device proceeds to operation 513 and stops outputting of a notification. For example, as shown in FIG. 8B, when a notification event for "missed calls" is a 10th unconfirmed notification event, the electronic device recognizes that the unconfirmed notification events whose number is at or above a reference number occurs while the timer is driving. Accordingly, the electronic device, as shown in FIG. 8C stops outputting of notification (operation 853). At this time, as shown in FIG. 8A, when "kind of notification" 815 in setting of "combined notification mode" 801 is set to "mute+maintaining screen turning off", the electronic device can change both sound and screen to in OFF states. Thereafter, the electronic device ends the present algorithm.

In the above described embodiment, when notification events whose number is a reference number or more occur in a reference time, the electronic device stops outputting of notifications. In another embodiment, the electronic device outputs notifications after a reference time for notification events that occur after the stopping of outputting of notification.

Figure 6:
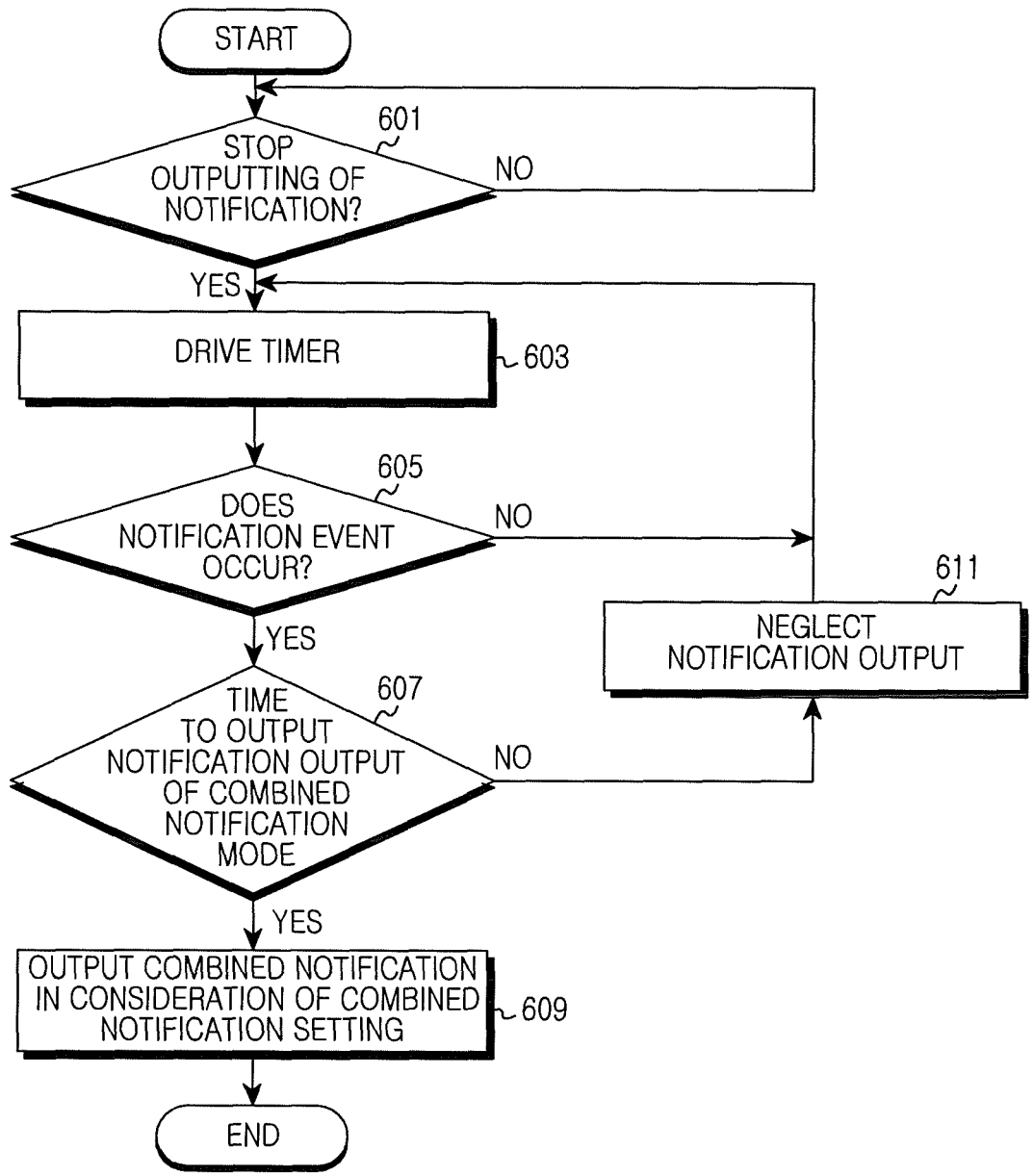
FIG. 6 illustrates a procedure for outputting notifications after the second reference time for notification events whose number is a reference number or more occurred within the first reference time in an electronic device according to certain embodiments of the present disclosure.

FIG. 6 illustrates a procedure for outputting notifications after the second reference time for notification events whose number is a reference number or more occurred within a first reference time in an electronic device according to another embodiment of the present disclosure. Referring to FIG. 6, the electronic device confirms whether the output of the notification is stopped in operation 601. For example, as shown in FIG. 8A, when a notification event occurs, which meets a condition that "time confirmation range" 811 in setting of "combined notification mode" 801 is set to "within 15 min.", and "the number of reception times" 813 is "more than 5 cases", the electronic device recognizes that the notification output is stopped.

When the notification output is stopped, the electronic device proceeds to operation 603 and drives the timer. Here, the timer is used for confirming whether it is time to output a combined notification for notification events that occur after the electronic device stops outputting of a notification. For example, as shown in FIG. 8A, when "notification time" 817 in the setting of "combined notification mode" 801 is set to "after one hour", the electronic device sets the timer driving time to one hour.

After the timer is driven, the electronic device proceeds to operation 605 and confirms whether notification events occur. For example, the electronic device confirms that notification events for outputting at least one of sounds, vibrations, turning the screen on and turning a light on occur in at least one application program.

When notification events occur in operation 605, the electronic device proceeds to operation 607 and confirms whether it is time to output a combined notification output. For example, as shown in FIG. 8A, when "notification time" 817 in the setting of "combined notification mode" 801 is set to "after one hour", the electronic device confirms whether driving time of the timer driven in operation 603 is after one hour.

When it is not yet time to output the combined notification in operation 607, the electronic device proceeds to operation 611 and neglects the notification output. For example, as shown in FIG. 8C, the electronic device neglects a notification output for notification events that occur in the time range "11:20 to 12:19" 837 in consideration of driving time of the timer. At this time, the electronic device, as shown in FIG. 8A, can maintain the "mute+screen turning off" state in consideration of "kind of notification" 815.

Figure 8D:
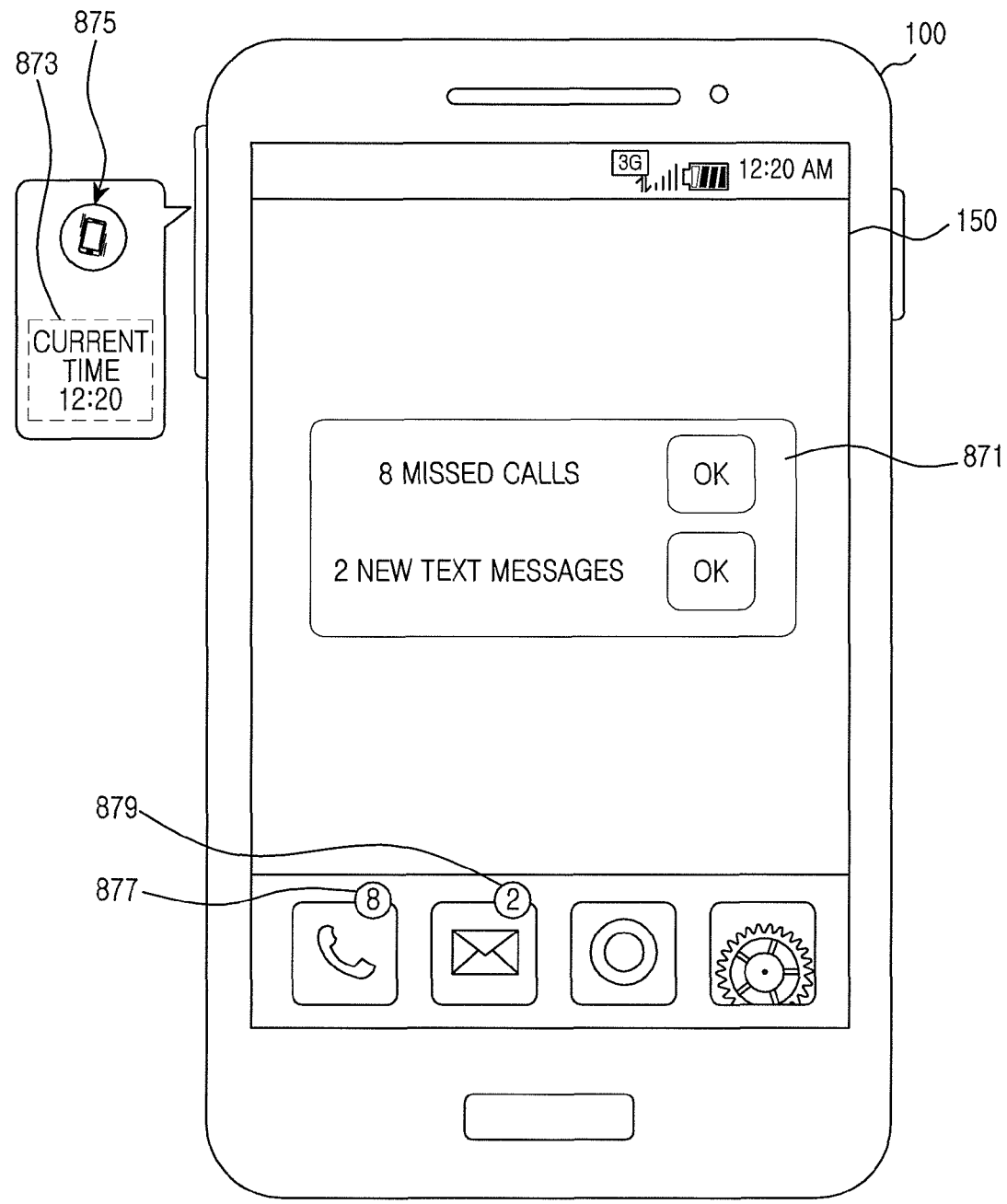

Furthermore, when it is time to output the combined notification in operation 607, the electronic device proceeds to operation 609 and outputs the combined notification in consideration of the combined notification setting. For example, as shown in FIG. 8D, when a notification event occurs at "12:20", which is after the timer driving time "11:20 to 12:19" 837, the electronic device outputs notification by "vibration" in consideration of the "kind of final notification" 819 of FIG. 8A. At this time, the electronic device can output notifications at once for notification events occurred in the time range "11:20 to 12:19" and having notification outputs thereof neglected. Thereafter, the electronic device ends the present algorithm.

Figure 7:
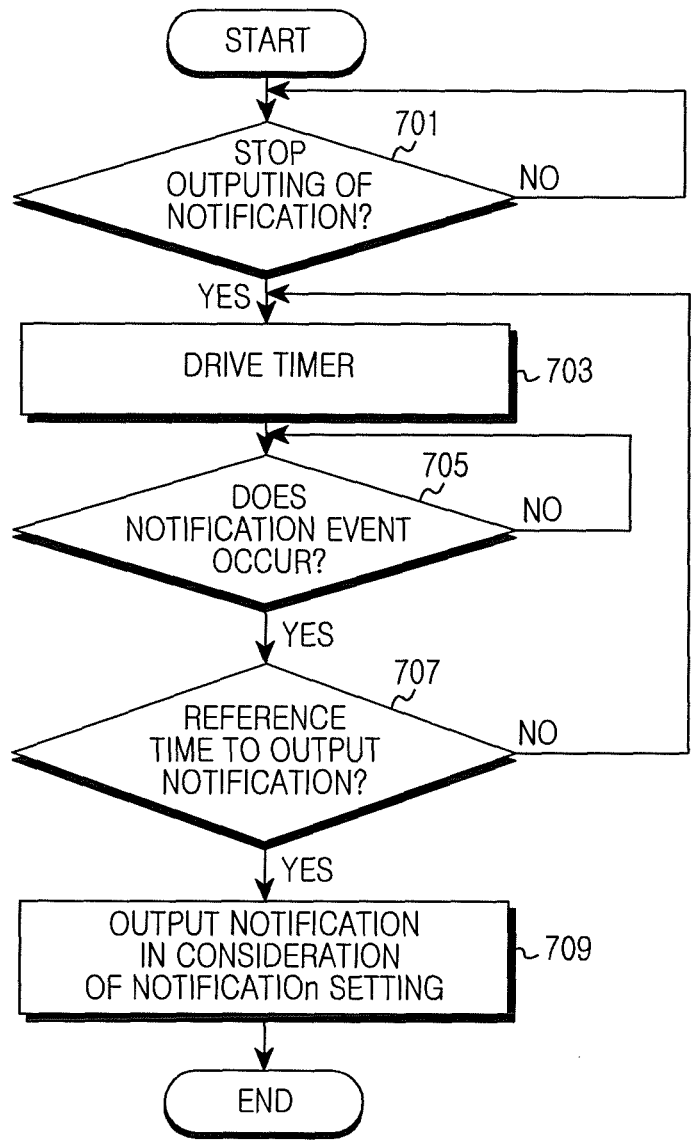
FIG. 7 illustrates a procedure for outputting notification events in consideration of notification events occurred after the second reference time, when notification events whose number is a reference number or more occur within the first reference time in an electronic device.

FIG. 7 illustrates a procedure for outputting a notification event in consideration of notification events that occur after the second reference time, when notification events whose number is a reference number or more occur within a first reference time in an electronic device according to certain embodiments of the present disclosure. Referring to FIG. 7, the electronic device confirms whether the notification output is stopped in operation 701. For example, as shown in FIG. 8A, when a notification event occurs, which meets a condition that "time confirmation range" 811 in setting of "combined notification mode" 801 is set to "within 15 min.", and "the number of reception times" 813 is "more than 5 cases", the electronic device recognizes that the notification output is stopped.

When the notification output is stopped, the electronic device proceeds to operation 703 and drives the timer. Here, the timer is used for confirming time taken until a notification event occurs after a notification output is stopped in the electronic device.

After the timer is driven, the electronic device proceeds to operation 705 and confirms whether a notification event occurs. For example, the electronic device confirms whether a notification event including at least one of sounds, vibrations, turning the screen on and turning a light on occurs in at least one application program.

When a notification event occurs in operation 705, the electronic device proceeds to operation 707 and confirms whether an occurrence time point of the notification event is equal to or later than a reference time point. Here, the reference time point indicates a time point to output notifications for notification events that occur after the notification output is stopped in the electronic device. At this time, the reference time point can be preset by a system or a user. Also, the reference time point is assumed to be 5 min. in the present embodiment.

When an occurrence time of a notification event is earlier than the reference time point in operation 707, the electronic device proceeds to operation 703 and drives the timer. For example, when a notification event occurs after 4 min. from the stopping of the notification, which is earlier than the reference time point of 5 min., the electronic device recognizes that a condition for outputting a notification is not met. Accordingly, the electronic device proceeds to operation 703 and drives again the timer.

When the occurrence time of the notification event is equal to or later than the reference time point in operation 707, the electronic device proceeds to operation 709 and outputs a notification in consideration of the notification setting. For example, when a notification event occurs after 6 min. from the stop of the notification output, which is later than the reference time point of 5 min., the electronic device recognizes that a condition for outputting notification is met. Accordingly, the electronic device outputs a notification including at least one of sounds, vibrations, turning the screen on, and turning a light on. Thereafter, the electronic device ends the present algorithm.

As described above, the electronic device according to the present disclosure can reduce power consumption and a noise by outputting notifications after a second reference time for notification events whose number is a reference number or more occurred within a first reference time.

It will be understood by those skilled in the art that various changes in form and details may be made from the disclosure without departing from the spirit and scope of the application as defined by the appended claims. Therefore, the scope of the disclosure is defined not by the detailed description of the disclosure but by the appended claims, and all differences within the scope will be construed as being included in the present disclosure.

What is claimed is:

1. A method implemented using an electronic device, the method comprising:
   detecting notification events;
   determining whether the notification events exist within a first reference time interval using a timer by:
      determining whether the timer is driven, and
      when the timer is not driven, driving the timer;
   initializing the number of the unconfirmed notifications in response to driving the timer;
   when the notification events exist within the first reference time interval, determining whether a number of unconfirmed notifications including the notification events exceeds a reference number; and
   when the number of unconfirmed notifications exceeds the reference number, outputting the notification events that correspond to the unconfirmed notifications after a second reference time interval and stopping an output of notification events detected before the second reference time interval.

2. The method of claim 1, wherein the notification events comprise at least one of a sound, a vibration, turning on a screen, and turning on a light in at least one application program.

3. The method of claim 1, further comprising outputting the notification events when the number of the unconfirmed notifications does not exceed the reference number.

4. The method of claim 1, further comprising setting information to control a notification.

5. The method of claim 4, further comprising displaying a setting screen to set at least one of a combined notification mode, a time confirmation range, a number of receptions, a kind of notification, a notification time, or a kind of final notification.

6. The method of claim 4, further comprising storing user setting selections.

7. The method of claim 1, wherein the electronic device comprises at least one of a mobile communication terminal, a personal digital assistant (PDA), a laptop, a smart phone, a net book, a television, a mobile internet device (MID), an ultra-mobile PC (UMPC), a tablet PC, a navigator, or an MP3 player.

8. The method of claim 1, wherein when the timer is being driven, the electronic device can update the number of unconfirmed notifications by adding "1".

9. An electronic device comprising:
   at least one processor;
   at least one memory; and
   at least one program stored in the at least one memory and configured to be executed by the at least one processor,
      wherein the at least one processor, upon executing the at least one program, is configured to:
   detect notification events,
   determine whether the notification events exist within a first reference time interval using a timer by:
      determining whether the timer is driven, and
      when the timer is not driven, driving the timer,
   initialize the number of the unconfirmed notifications in response to driving the timer,
   when the notification events exist within the first reference time interval, determine whether a number of unconfirmed notifications including the notification events exceeds a reference number, and
   output the notification events that correspond to the unconfirmed notifications after a second reference time interval and stop an output of notification events detected before the second reference time interval when the number of unconfirmed notifications exceeds the reference number.

10. The electronic device of claim 9, wherein the notification events comprise at least one of a sound, a vibration, turning on a screen, and turning on a light in at least one application program.

11. The electronic device of claim 9, wherein the processor is further configured to output the notification events when the number of the unconfirmed notifications does not exceed the reference number.

12. The electronic device of claim 9, wherein the processor is further configured to set information to control a notification.

13. The electronic device of claim 12, wherein the processor is further configured to display a setting screen to set at least one of a combined notification mode, a time confirmation range, a number of receptions, a kind of notification, a notification time, or a kind of final notification.

14. The electronic device of claim 13, wherein the processor is further configured to store user setting selections.

15. The electronic device of claim 9, wherein the electronic device comprises at least one of a mobile communication terminal, a personal digital assistant (PDA), a laptop, a smart phone, a net book, a television, a mobile internet device (MID), an ultra-mobile PC (UMPC), a tablet PC, a navigator, or an MP3 player.

16. The electronic device of claim 9, wherein when the timer is being driven, the electronic device can update the number of unconfirmed notifications by adding "1".

* * * * *